March 31, 1936. R. P. PARADISE Re. 19,913

NOZZLE

Original Filed Aug. 5, 1931

Inventor,
Raymond P. Paradise,
By Minturn & Minturn,
Attorneys.

Reissued Mar. 31, 1936

Re. 19,913

UNITED STATES PATENT OFFICE 19,913

NOZZLE

Raymond P. Paradise, Indianapolis, Ind.

Original No. 1,922,259, dated August 15, 1933, Serial No. 555,272, August 5, 1931. Application for reissue June 19, 1935, Serial No. 27,422

4 Claims. (Cl. 299—106)

This invention relates to the art of nozzles or jets and particularly to the opening therethrough.

It is a primary purpose of my invention to provide an orifice through which a flow of liquids is had to break up the flow whereby there is not a solid stream discharge to have the discharge flow in the form of small particles and not in a solid column.

It is a primary object of my invention to provide an orifice fitting which may be made very cheaply and which is of such conformation that the orifice therethrough is practically self cleaning and not subject to being clogged in ordinary service.

Figure 1:
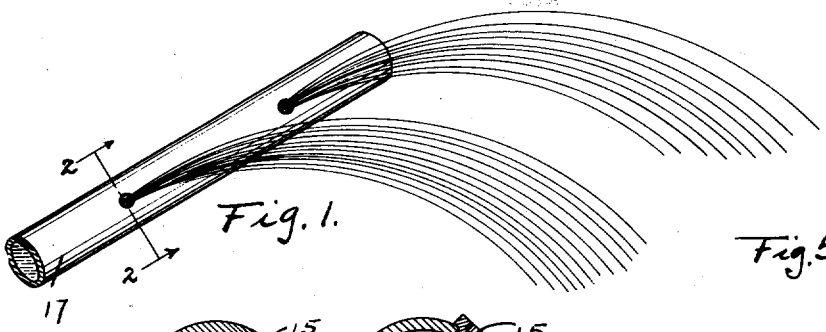
Figure 5:
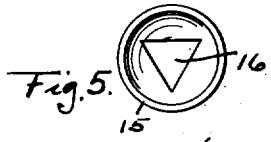
Figure 2:
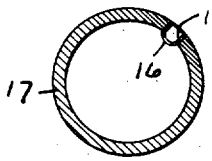
Figure 3:
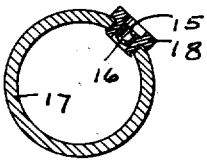
Figure 6:
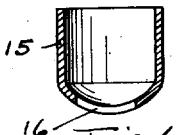
Figure 4:
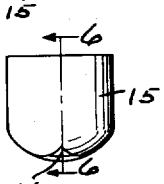
Figure 8:
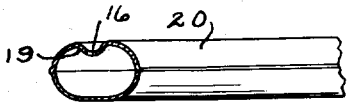
Figure 7:
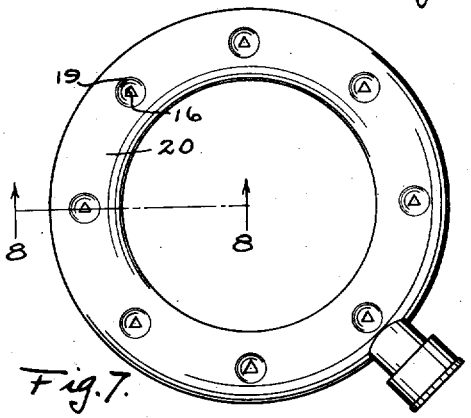

These and other objects will become apparent in the following description of the invention as illustrated by the accompanying drawing, in which Fig. 1 is a view in perspective of a short length of irrigating pipe line to which my invention is applied;

Fig. 2, a section through the pipe line on the line 2—2 in Fig. 1;

Fig. 3, a similar section showing a modified form of orifice fitting;

Fig. 4, a side elevation of an orifice cup embodying my invention;

Fig. 5, a top plan view of the cup;

Fig. 6, a vertical section through the cup on the line 6—6 in Fig. 4;

Fig. 7, a top plan view of a lawn sprinkler head to which the invention is applied;

Fig. 8, a section on the line 8—8 in Fig. 7.

Like characters of reference indicate like parts throughout the several views in the drawing.

Referring first to Figs. 1–6, I form a cup 15 to have a bottom bulged outwardly to protrude convexly. Through the bottom, I punch or broach a hole 16 to have a plurality of straight sides whereby the sides meet to form angles spaced upwardly around the bottom at elevations above the center thereof. The hole 16 is here shown as triangularly shaped, the essential feature of the hole being that parts of the edges thereof be at various elevations as compared to other parts, and this difference in elevation is here shown as being achieved by forming a non-circular hole through the curved bottom.

The cup 15 is pressed into openings in the pipe 17 a few thousandths of an inch less in diameter than the external diameter of the cup 15 to have the cup retained by a pressed fit. It is to be noted that the convex bottom of the cup is positioned toward the oncoming fluid. Where it is not feasible or advisable to press the cup directly into the pipe outlet, a screw fitting 18 is provided into which the cup 15 is pressed, Fig. 3, and the fitting 18 is screw-threadedly entered in the pipe 17.

The cup with its orifice may, of course, be formed integrally in the wall of the fluid conductor as, for example, in Figs. 7 and 8, where the cup 19 is pressed directly into the wall of the sprinkler head 20 to form a convex button projecting to within the head with the orifice cut therethrough.

By positioning the orifice cup to have its convex end presented toward the oncoming fluid, and by forming the noncircular orifice in this convex end, parts of the orifice extend around the end away from the center. By reason of this structure, all of the fluid in a given transverse plane through the oncoming fluid does not pass through the orifice simultaneously. The central part escapes through the center of the orifice, while outlying portions in that plane have to travel farther before finding an outlet in the corners of the orifice at higher elevations. In other words, part of the flow is delayed as compared to another part, and this action might be compared roughly to the action of light in passing through a prism where the light rays are bent and separated to break the solid light stream up into individual smaller streams. Also, the flow is restricted by the shape of the hole itself to further the breaking up of the stream.

In irrigation work, water discharging from the orifice as here shown and described breaks up into minute particles, yet the water is thrown a considerable distance, in fact, as great a distance as is obtained by the heretofore commonly employed circular orifice, with the result that the ground is not washed nor compacted to dry out with a caked surface.

A circular orifice of small diameter clogs very easily should particles of dirt, rust, or the like be in the fluid. The orifice shaped as herein described does not clog readily for the reason that at least one corner is left uncovered by the solid particle with the result that some fluid flows therepast through the orifice and tends to wash the particle to one side. Also, by reason of the convex bottom of the cup being directly toward the oncoming flow, the solid particles tend to slide around the bottom away from the orifice.

While I have here shown and described my invention in the best form as now known to me, it is obvious that structural changes may be made without departing from the spirit of the invention, and I, therefore, do not desire to be limited to that precise form beyond the limitations of the following claims.

I claim:

1. An irrigating pipe line side outlet nozzle comprising a cup shaped member having a convex inner end presented toward water in the line and an outlet orifice centrally located in said end, through which orifice the water may escape from the line at right angles to the flow through the line, said orifice having three sides intersecting in a plane outwardly removed from the innermost part of said end.

2. A liquid discharge nozzle including a cup-shaped member open across the outlet end, convexly protruding at the inlet end, and having a triangular orifice in the convex inlet end centrally located thereof.

3. An irrigating pipe line side outlet nozzle comprising a cup shaped member having a convex inner end presented toward water in the line and an outlet orifice centrally located in said end through which orifice the water may escape from the line at right angles to the flow through the line, said orifice having three sides intersecting in a plane outwardly removed from the innermost part of said end, and a cylindrical body supporting said member therein to have said end spaced outwardly slightly from the inlet end of the body.

4. A liquid discharge nozzle including a cup-shaped member open across one end and convexly protruding at the other end and having a triangular orifice in the convex end centrally located thereof.

RAYMOND P. PARADISE.